United States Patent [19]

Kohno et al.

[11] 3,964,446
[45] June 22, 1976

[54] ROTARY PISTON INTERNAL COMBUSTION ENGINE

[75] Inventors: Toshiyuki Kohno, Toyoake; Kenichi Imaizumi, Toyota, both of Japan

[73] Assignee: Toyota Jidosha Kogyo Kabushiki Kaisha, Japan

[22] Filed: Jan. 2, 1975

[21] Appl. No.: 538,165

[30] Foreign Application Priority Data

Aug. 27, 1974  Japan.............................. 49-97503

[52] U.S. Cl. .............................................. 123/8.13
[51] Int. Cl.² ........................................ F02B 53/10
[58] Field of Search........................... 123/8.09, 8.13

[56] References Cited
UNITED STATES PATENTS

| 3,136,302 | 6/1964 | Nallinger et al. ............. 123/8.09 X |
| 3,780,707 | 12/1973 | Cole................................... 123/8.13 |

FOREIGN PATENTS OR APPLICATIONS 959,235  5/1965  United Kingdom................ 123/8.13

*Primary Examiner*—Carlton R. Croyle
*Assistant Examiner*—Michael Koczo, Jr.
*Attorney, Agent, or Firm*—Toren, McGeady and Stanger

[57]  ABSTRACT

The inner peripheral wall of a rotary engine housing is provided with first and second port means which open into a combustion chamber of the engine as the apex seals of the rotor pass the port means in timed relationship. The first port means introduce an air-fuel mixture and the second port means, which are spaced from the first port means forwardly in the direction of rotor rotation subsequently introduce air into the chamber. Thus, a stratified charge consisting of a layer of air and a denser layer of air-fuel mixture is provided within the combustion chamber.

2 Claims, 3 Drawing Figures

ROTARY PISTON INTERNAL COMBUSTION ENGINE

BACKGROUND OF THE INVENTION

The present invention relates generally to rotary piston internal combustion engines and more particularly to improvements in the structure of such engines whereby stratification of the combustion chamber charge may be effected. More specifically, the invention relates to means whereby a stratified charge, consisting of an air lamina and of a lamina of air-fuel mixture, may be obtained.

In a rotary piston internal combustion engine of the conventional type, a combustible charge ignited by a spark plug spreads rapidly through the combustion chamber of the engine toward the leading side of the chamber taken with respect to the direction of rotation of the rotor. However, it has been found that the ignited charge does not satisfactorily permeate the trailing side of the combustion chamber taken in a direction rearwardly of the direction of rotor rotation. As a result, conventional rotary engines give rise to serious problems related to incomplete combustion which tends to occur in the trailing side of the combustion chamber resulting in increased fuel consumption as well as increase in the detrimental components, such as HC, CO, etc. contained in the unburned exhaust gases thereby causing increased air pollution.

However, rotary engines have been found to involve an inherent characteristic feature giving rise to a gas flow effect within the combustion chamber resulting from rotation of the rotor. Since the gas flowing into the combustion chamber tends to flow along with the rotor as it rotates, a graded air-fuel mixture may be charged into the combustion chamber. In the operation of the engine, dense and light strata which are matched with the graded air-fuel ratio of the mixture can be maintained within the combustion chamber even during the decompression stroke.

In an attempt to overcome the aforementioned problems by utilization of inherent characteristics of the rotary engine, there has been heretofore proposed provision of two ports in the suction system of the engine, with one port being utilized for charging a denser air-fuel mixture into the combustion chamber with the other port being utilized for charging air. Provision of these ports makes it possible to feed and stratify, respectively, the denser mixture toward the leading side of the combustion chamber with the air being provided in the trailing side of the combustion chamber. As a result, the tendency toward incomplete combustion is diminished in the trailing side of the combustion chamber where the ignited flame would otherwise spread nonuniformly.

In accordance with a typical known approach utilizing this concept, one of the ports of the suction system is provided in the side wall of the rotor housing and it is opened or closed in accordance with passage thereover of the engine side seal provided on the engine rotor. As a result of this arrangement, gas from the side port is directed into the combustion chamber from a direction extending perpendicular to the direction of rotor rotation, i.e. in a direction parallel to the axis of rotation of the rotor. As a result, the gas introduced from the side wall of the rotor housing will collide with gas already present in the combustion chamber thereby causing increased turbulence within the chamber at the time of charging. Consequently, it has been found extremely difficult to effect distinctive stratification of the gases contained within the combustion chamber.

The present invention is directed primarily to provision of a solution for this problem by adapting the structure of a conventional rotary engine to provide an improved mode of operation whereby a denser air-fuel mixture together with air may be charged into the combustion chamber separately thereby to effect distinctive, stable stratification in lamina form of the charge within the combustion chamber.

SUMMARY OF THE INVENTION

Briefly, the present invention may be described as an improvement in a rotary piston internal combustion engine which includes a rotor housing having a trochoidally shaped inner peripheral wall defining the peripheral wall of a rotary piston chamber, said trochoidally shaped inner wall including a pair of opposed short axis sides. A rotary piston including a plurality of apex seals is mounted within the piston chamber for rotation therein in a given direction, with the apex seals of the rotor being slidably engaged against the piston chamber peripheral wall. The improvement of the present invention comprises, in combination, first port means opening at one of the short axis sides of the peripheral wall and located in a forward portion of said one short axis side taken in the direction of rotor rotation. Second port means opening through the piston chamber peripheral wall are also provided at the same short axis side as the first port means and adjacent the first port means on a side thereof taken forwardly in the direction of rotor rotation. The first port means are adapted to introduce a fuel-air mixture into the engine combustion chamber and the second port means operate to charge air thereinto. Thus, as the denser air-fuel mixture is charged, rotor rotation tends to cause this denser mixture to flow toward the forward side of the combustion chamber, taken in the direction of rotor rotation, with the air charge being subsequently introduced through the second port means to occupy the trailing side of the combustion chamber. As a result, a stratified charge consisting of an air-fuel lamina and of a lamina of air is produced.

The various features of novelty which characterize the invention are pointed out with particularity in the claims annexed to and forming a part of this disclosure. For a better understanding of the invention, its operatong advantages and specific objects attained by its use, reference should be had to the accompanying drawings and descriptive matter in which there is illustrated and described a preferred embodiment of the invention.

DESCRIPTION OF THE PREFERRED EMBODIMENT

Figure 1:
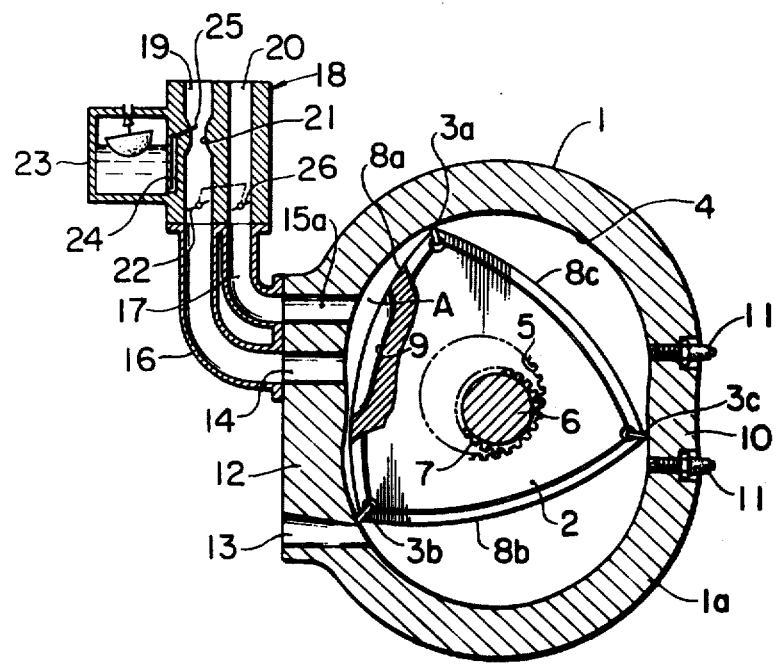
FIG. 1 is a sectional view of a rotary engine embodying the improvement of the present invention.

Referring now to the drawing, the present invention is illustrated as embodied in a rotary engine comprising a rotor housing 1 consisting of a wall 1a having an inner surface 4. The inner surface 4 defines the peripheral wall of a rotor chamber within which there is disposed for eccentric rotation a rotor 2 having three apexes 3a, 3b, 3c, each of which include an apex seal slidably engaged against the wall 4 during rotation of the rotor 2. A gear 7 fixed upon an eccentric shaft 6 is arranged for engagement with an internal gear 5 of the rotor 2. The peripheral wall 4 is formed with a trochoidal configuration including a pair of opposed short axis sides 10 and 12. The rotor 2 is configured with three curved contoured sides 8a, 8b, 8c, extending between each pair of apex seals with each of the rotor sides having defined therein centrally located combustion chamber grooves 9.

A spark plug 11 is disposed on one of the short axis sides 10 of the peripheral wall 1a with an exhaust port 13 being disposed on the opposite short axis side 12. The exhaust port 13 is located in a portion of the short axis side 12 located rearwardly thereof in a trailing direction taken with respect to the direction of rotation of the rotor 2 which, as viewed in FIG. 1, rotates in a clockwise direction.

Figure 2:
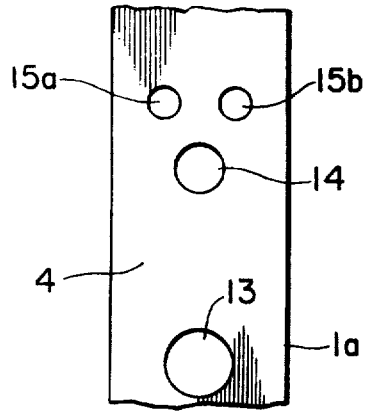
FIG. 2 is an internal side view illustrating a portion of the peripheral wall of the rotor housing having the port means of the present invention arranged therein.

FIG. 2 depicts an internal view of the short axis portion 12 of the peripheral wall 4 wherein there is illustrated an arrangement of ports in accordance with the present invention. First port means consisting of a peripheral port 14 opens through the peripheral wall 4 along the short axis portion 12 thereof on a side of the short axis portion 12 forwardly thereof taken in the direction of rotor rotation. The peripheral port 14 is located proximate the center of the short axis portion 12 and is arranged to charge into the rotor chamber a fuel-air mixture. Second port means in the form of a pair of peripheral ports 15a and 15b are located to open through the short axis portion 12 on a side of peripheral port 14 forwardly thereof taken in the direction of rotor rotation. The ports 15a and 15b operate to charge air into the combustion chamber of the engine.

A conduit 16 communicates the port 14 with an inlet passageway 19 of a carburetor 18 and a port 17 communicates both the ports 15a and 15b with an air inlet passageway 20 of the carburetor 18. The carburetor 18 generally comprises a conventional configuration and the inlet passageway 19 is connected to a venturi 21, with a throttle valve 22 being provided downstream of the venturi 21. A nozzle 25 injects fuel from a fuel chamber 23 through a conduit 24 into the passageway 19 which directs the dense mixture of fuel and air so formed and feeds the mixture to the peripheral port 14.

The air feed passageway 20 includes another throttle valve 26 which is interlocked with the throttle valve 22 and which operates to feed only air from an air cleaner (not shown) by operation of the suction created within the engine which is applied to the peripheral ports 15a, 15b.

Figure 3:
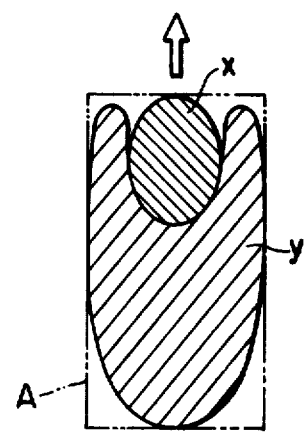
FIG. 3 is a schematic representation of the stratified gas charge provided within the combustion chamber.

As shown in FIGS. 1 and 3, a combustion chamber A is defined between the peripheral wall 4 of the housing 1 and the curved sides of the rotor 2. As shown in FIG. 1, the engine is depicted at a phase of its operation whereby a rotor side 8a is positioned adjacent the portion of the peripheral wall 4 having therein the ports 14 and 15a, 15b. The peripheral port 14 is opened into the combustion chamber A immediately following the suction stroke by passage thereacross of the apex seal 3a of the rotor 2. Thus, a dense mixture of air and fuel is fed from the mixture feed passageway 19 of the carburetor 18 into the combustion chamber A as the rotor 2 continues to rotate and the apex seal 3a passes over the peripheral ports 15a, 15b. They subsequently open into the combustion chamber A thereby permitting air to be charged into the combustion chamber from the air feed passageway 20 of the carburetor 18.

The denser air-fuel mixture and the separately charged air thus introduced into the combustion chamber A are caused to flow along the combustion chamber in the direction of rotation of the rotor 2. Depending upon the timing and the position of the charge introduced, however, the denser mixture at the initial stage of charging is fed to the center of the combustion chamber and remains toward its leading side as indicated by the reference character X shown in FIG. 3. In FIG. 3, the direction of rotor rotation is indicated by the arrow and while the air-fuel mixture charge X remains toward the forward end of the combustion chamber, the air which is charged subsequently thereto is directed into and remains at the trailing side of the combustion chamber. The air charge located in the trailing side of the combustion chamber is indicated by the reference character Y. Thus it will be seen that two separate strata of charge are formed with the charge X comprising a denser air-fuel mixture while the charge Y comprises air alone.

In this manner there is formed a stratified charge in the combustion chamber with a forward lamina segment thereof comprising the denser air-fuel mixture located in the leading side of the chamber while a rearward lamina segment of air is formed in the trailing side of the combustion chamber. The charge is, in turn, compressed under the conditions illustrated along with rotation of the rotor and it is subsequently ignited by the spark plug at the end of the compression stroke. Thereupon, only the mixture in the leading side of the combustion chamber burns explosively with spread of flame induced thereby imparting a turning force to the rotor 2.

The burned gas as well as the air in the trailing side of the combustion chamber are further conveyed as the rotor continues to rotate and they are subsequently discharged from the housing through the exhaust port 13.

The mode of operation previously described will be repeated in other combustion chambers substantially in a manner similar to that above described as the rotor 2 continues to rotate through its operating cycle.

As will be apparent to those skilled in the art, the number and the positioning of the peripheral ports for charging the denser air-fuel mixture and the air charge need not necessarily be limited to the specific arrangement depicted herein in connection with the preferred embodiment and it will be obvious that various combinations may be effected as desired. Furthermore, a fuel injection device may be employed in place of the carburetor for charging the denser air-fuel mixture and in a further alternative mode of operation, the arrangement of the stratified charge may be altered by supplying two separate charges, each comprising an air-fuel mixture with each charge having a different air-fuel ratio.

Thus, in accordance with the present invention, both a denser mixture and air are fed to the combustion chamber A through three peripheral ports 14, 15a, 15b, in a manner whereby there occurs very little turbulence in the gases which are fed. Thus, stratification of the charge may be effected to provide a charge which is more stable and accurate. By comparison with conventional rotary engines wherein the air feed port is provided on the side housing, the rotary engine in accordance with the present invention provides significant advantages and superior performance in that the volumetric efficiency is improved to an appreciable extent and inertia supercharge is made easier.

While specific embodiments of the invention have been shown and described in detail to illustrate the application of the inventive principles, it will be understood that the invention may be embodied otherwise without departing from such principles.

What is claimed is:

1. A rotary piston engine comprising a rotor housing with a trochoidally shaped inner peripheral wall defining the peripheral wall of a rotary piston chamber, said trochoidally shaped inner wall including a pair of opposed short axis sides, a rotary piston including a plurality of apex seals mounted within said rotary piston chamber for rotation therein in a given direction with said apex seals slidably engaged against said peripheral wall, first port means opening through said peripheral wall at one of said short axis sides, second port means opening through said peripheral wall at the same short axis side thereof as said first port means, air-fuel mixture supply means in flow communication with said first port means for introducing air-fuel mixture therethrough into said piston chamber, and air supply means in flow communication with said second port means for introducing air therethrough into said piston chamber, both said first and said second port means being located on a forward portion of said one short axis side of said inner peripheral wall taken in the direction of rotor rotation, said second port means opening at said one short axis side adjacent said first port means and on a forward side of said first port means taken in the direction of rotor rotation.

2. An engine according to claim 1, wherein said first port means consists essentially of a single port and wherein said second port means consist essentially of a pair of ports generally equidistantly spaced from said single port on one side thereof.

* * * * *